United States Patent [19]
McGlothlin et al.

[11] Patent Number: 6,075,073
[45] Date of Patent: Jun. 13, 2000

[54] LATICES FROM EMULSIFIED HYDROCARBON RUBBER SOLUTIONS BY MEMBRANE SEPARATION

[75] Inventors: Mark W. McGlothlin; Eric V. Schmid, both of San Diego, Calif.

[73] Assignee: Apex Medical Technologies, Inc., San Diego, Calif.

[21] Appl. No.: 09/137,463

[22] Filed: Aug. 20, 1998

[51] Int. Cl.$^7$ ...................................................... C08J 3/02
[52] U.S. Cl. ...................... 523/310; 523/332; 523/340; 528/502 A; 210/637; 210/639; 210/640; 210/641; 210/643; 210/644; 210/651; 210/652; 210/654
[58] Field of Search ...................................... 523/310, 332, 523/340; 528/502 A; 210/637, 639, 640, 641, 643, 644, 651, 652, 654

[56] References Cited

U.S. PATENT DOCUMENTS

| | | |
|---|---|---|
| 3,215,649 | 11/1965 | Preiss et al. . |
| 3,285,869 | 11/1966 | Ronay et al. . |
| 3,886,109 | 5/1975 | van Hardeveld et al. . |
| 3,988,275 | 10/1976 | Satake et al. . |
| 3,998,772 | 12/1976 | Beerbower et al. . |
| 4,160,726 | 7/1979 | DelPico . |
| 4,553,983 | 11/1985 | Baker . |
| 4,960,520 | 10/1990 | Semmens . |
| 5,030,356 | 7/1991 | Blume et al. . |
| 5,039,461 | 8/1991 | Tsushima . |
| 5,110,475 | 5/1992 | Rossling et al. . |
| 5,112,900 | 5/1992 | Buddenhagen et al. . |
| 5,171,767 | 12/1992 | Buckley et al. . |
| 5,236,474 | 8/1993 | Schofield et al. . |
| 5,352,361 | 10/1994 | Prasad et al. . |
| 5,417,847 | 5/1995 | Wijmans et al. . |
| 5,507,949 | 4/1996 | Ho . |
| 5,512,180 | 4/1996 | Ho . |
| 5,552,053 | 9/1996 | Ho et al. . |
| 5,569,740 | 10/1996 | Tanaka et al. . |
| 5,595,658 | 1/1997 | Fritsch et al. . |
| 5,639,375 | 6/1997 | Hiroshi . |

*Primary Examiner*—Andrew E. C. Merriam
*Attorney, Agent, or Firm*—Townsend and Townsend and Crew LLP

[57] ABSTRACT

Rubbery polymers in hydrocarbon solutions are emulsified in aqueous liquids and converted to latices by partitioning the emulsion through a membrane of selective permeability to the hydrocarbon solvent relative to both water and the polymer, thereby removing the hydrocarbon solvent from the emulsion. The foaming that is often associated with removing hydrocarbon solvent from aqueous emulsions by conventional means is thus avoided. Membrane partitioning mechanisms that are useful for this application include those involving both nonporous and microporous membranes, those passing the solvent both as a liquid and as a gas, those drawing off the permeate as both a liquid and a gas, and various combinations of these methods.

18 Claims, No Drawings

LATICES FROM EMULSIFIED HYDROCARBON RUBBER SOLUTIONS BY MEMBRANE SEPARATION

This invention resides in the field of synthetic rubber manufacture, particularly processes in which polymerization occurs in a hydrocarbon solvent. This invention specifically addresses the difficulties of removing the solvent from the polymerized material to form a latex.

BACKGROUND OF THE INVENTION

Many synthetic rubbers or elastomers are produced by emulsion polymerization. This process forms a latex directly, the polymer being the dispersed phase and water being the continuous phase. Nitrile rubber and styrene-butadiene rubber are prominent examples of synthetic rubbers that can be prepared in this manner. Other synthetic rubbers cannot be formed by emulsion polymerization, and instead require solution polymerization in a hydrocarbon solvent. Prominent among these are polybutadiene rubbers and polyisoprene rubbers, notably cis-1,4-polyisoprene. To produce a latex from these polymers, the polymer must be emulsified as a hydrocarbon solution with water and an emulsifying agent followed by removal of the solvent from the emulsion. Synthetic polyisoprenes vary in their content of cis-1,4-polyisoprene, those with a higher content having properties closer to those of natural rubber.

Solvent removal is a difficult step in the manufacture of synthetic rubber. When the emulsion is heated to vaporize the solvent, foam or froth forms, which interferes with the formation of the latex, particularly by prolonging the processing time. Foam formation can be reduced by using a reduced heating rate, but this is economically unfavorable since it prolongs the processing time. The use of low-foaming surfactants to reduce foaming is disclosed by Preiss et al., U.S. Pat. No. 3,215,649, but these merely reduce the foaming rather than eliminate it. The use of flash distillation followed by tangentially intersecting the resulting foam with a heated vapor stream is disclosed by van Hardeveld et al., U.S. Pat. No. 3,886,109. This requires special surfactants and is a costly process which produces a latex of questionable stability.

In general, the rate of solvent removal by distillation, gas stripping or steam stripping is limited by the rate at which foam can be dissipated or actively broken by applied shear forces. If heat is applied too rapidly, the emulsion may overheat and foam over. Stripping systems of very large volume will be required to accommodate the large amount of slowly breaking foam. Even foams with low-foaming anionic surfactants require a significant amount of time to break. Steam stripping frequently impairs the stability of the resulting latex, causing coagulation. While the tendency toward coagulation can be reduced by chemical modification of the polymer, the modified polymer is thus less similar in structure to natural latex rubber and consequently has less favorable properties. The reductions furthermore do not eliminate the coagulation entirely.

The use of chemical defoaming agents has also been disclosed. Many of these agents are detrimental to the properties of the final latex, however, causing for example pin-hole formation. Mechanical means of breaking foams such as stirrers, baffles and air jets can lower the stability of the foam which will result in a greater tendency toward coagulation. Foams containing some surfactants, such as sodium lauryl sulfate, are not capable of being broken by mechanical means, even with extremely high shear forces. The high shear force will merely reduce the bubble size in these foams, rendering the foam even more difficult to control.

The use of rotary evaporators for foam control has been disclosed, but the centrifugal force in these evaporators can destabilize the emulsion or impose a compressive force on the liquid, making evaporation of the solvent more difficult.

SUMMARY OF THE INVENTION

It has now been discovered that rubbery polymer latices can be formed from solution-polymerized rubbery polymers, or rubbery polymers in a hydrocarbon solution regardless of the environment or phase in which the polymers were formed, without the disadvantages of the prior art. This is achieved by first emulsifying the rubbery polymer solution, then extracting the hydrocarbon solvent from the emulsion by membrane separation to partially or fully convert the emulsion to a latex. The process thus comprises:

(i) emulsifying the polymer solution in an aqueous liquid to form an oil-in-water emulsion, (ii) partitioning the emulsion through a membrane that preferentially passes the hydrocarbon solvent relative to both water and the rubbery polymer, and (iii) collecting the resulting latex (an aqueous suspension of the rubbery polymer) from the feed side of the membrane.

Surfactant and any excess water remaining in the feed-side suspension may be removed as an optional further step if needed or desired.

Membranes that are suitable for use in this invention include those that are of selective permeability that by virtue of their chemical composition preferentially pass the hydrocarbon solvent (referred to hereinafter as "perm-selective" membranes), as well as those that preferentially pass the solvent by a partial pressure differential of other analogous driving force. In either case, the membrane serves to extract the hydrocarbon solvent in a manner that does not induce foaming in the emulsion, even when an emulsifying agent is present. Thus, the selection of emulsifying agents is no longer limited by the high risk of foaming, chemical defoaming agents can be avoided, and the latex can be further processed or stored and shipped in a quick and efficient manner without providing for the residence time needed to break a foam. Distillation, gas stripping, steam stripping, air jets, shear forces, and other chemical and mechanical means of breaking the foam are all avoided, resulting in a reduction of both capital and operating costs and an efficient and continuous process that produces high quality latex whose properties are not limited by chemical additives or processing steps to break the foam.

Various kinds of membranes can be used, with a variety of extraction mechanisms. The membranes can be used with a variety of rubbery polymers and hydrocarbon solvents, and under a wide range of process conditions. These and other features, objects and advantages of the invention are explained in detail below.

DETAILED DESCRIPTION OF THE INVENTION AND PREFERRED EMBODIMENTS

Membrane separation systems using a variety of separation mechanisms are known in the art. Typical prior art applications of these systems include the removal of dissolved or dispersed volatile organic compounds from aqueous systems such as contaminated groundwater or chemical process water, the separation of water from organic liquids such as for example the breaking of an alcohol/water azeotrope without the use of pressurized or extractive distillation systems, and the separation of volatile organic compounds from gaseous or vapor streams. Many of the same types of membranes and processing conditions are useful in the present invention.

One type of membrane separation process is termed by those skilled in separation technology as "pervaporation," in which the membrane, or in the case of multi-layered membranes, at least one layer of the membrane, is nonporous and perm-selective. This membrane or layer preferentially passes the hydrocarbon solvent as a permeating vapor even though the emulsion is supplied to the feed side of the membrane in liquid, non-boiling form. The driving force for the selective permeation is a differential in the partial pressure of the hydrocarbon solvent across the membrane, and this differential can be enhanced or sustained by the use of either a sweep gas or a lowered pressure on the permeate side of the membrane, both serving to maintain a relatively low partial pressure of the hydrocarbon solvent on the permeate side. By appropriate selection of the chemical composition of the membrane, the selectivity of the pervaporation can be highly controlled. Examples of the types of polymers that can be used as pervaporation membranes are nitrile rubber, neoprene, silicone rubber (such as for example polydimethylsiloxane), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, polyesteramides, and block copolymers of polyethers and polyesters. The membranes used in this process are "nonporous" or "dense," which is frequently established by a dense skin on one side of the membrane. Further descriptions of such membranes and membrane materials are found in the literature, examples of which are Blume et al., U.S. Pat. No. 5,030,356 (Jul. 9, 1991), and Wijmans et al., U.S. Pat. No. 5,417,847 (May 23, 1995), both incorporated herein by reference. The membrane may be homogeneous in composition and form, or it may incorporate a gel or a liquid layer. The membrane can also be composite in form, in which the nonporous perm-selective membrane is one layer of dual-layer membrane, the second layer being a support layer which may be porous or microporous.

Further variations of pervaporation can be implemented. For example, pervaporation can be used in combination with decantation or other non-membrane separation processes if the emulsion contains an excess amount of hydrocarbon solvent and would benefit from a preliminary reduction in the solvent level. Still further, pervaporation can be performed at elevated temperature ("thermopervaporation") which in some cases will significantly increase the rate of separation of the hydrocarbon solvent.

Another membrane separation process is membrane vapor permeation, which again uses a nonporous membrane that preferentially passes the hydrocarbon solvent as a permeating vapor, but that involves vaporizing the hydrocarbon solvent contained in the emulsion before the solvent passes through the membrane. This process is favorable with certain emulsions, depending on the composition of the emulsion and the relative amounts of organic and aqueous phases. Examples of membrane vapor permeation systems are disclosed by Baker in U.S. Pat. No. 4,553,983 (Nov. 19, 1985), incorporated herein by reference.

A third membrane separation process is a process referred to by those skilled in the art as "membrane distillation" or "transmembrane distillation." In this process, a microporous membrane is used, but the pores of the membrane are not wetted with either phase of the emulsion. The term "microporous" is used herein as it is used in the art, and refers to a membrane having pores that are less than or equal to 0.1 micron in diameter. The membrane is preferably of a hydrophobic material. Examples are silicone rubber, butyl rubber, natural rubber, polysulfone, silicone rubber-coated polysulfone, polyvinyl chloride, polyarylene ethers, substituted polyacetylenes, polyurethane, hydrophobic polyimides, polyethylene, polypropylene, polybutylene, polyisoprene, polybutadiene, polytetrafluoroethylene, polyvinylidene fluoride, polyvinylidene chloride, polyhexafluoro propylene, and polystyrene, as well as copolymers of these materials. The most preferred membrane materials are silicone rubber, polyethylene, polypropylene, polytetrafluoroethylene, and polyvinylidene fluoride.

The driving force in membrane distillation is a partial pressure gradient of the hydrocarbon solvent across the membrane. The driving force can be increased by passing a sweep gas over the permeate side of the membrane or by applying a partial vacuum to the permeate side, preferably in conjunction with a chilled condenser to condense the permeating solvent vapor. Membrane distillation is less preferred for emulsions containing high concentrations of surfactants that promote the wetting of the pores. Specific examples of a membrane distillation system are disclosed by Schofield et al., U.S. Pat. No. 5,236,474 (Aug. 17, 1993), incorporated herein by reference.

A fourth membrane separation process is one referred to by those skilled in the art as "perstraction," which is a combination of membrane permeation and extraction. The membrane is a nonporous membrane of the type used in pervaporation, or a composite membrane with a nonporous membrane as one of the layers. On the permeate side of the membrane is a liquid-phase extracting solvent that preferentially dissolves the hydrocarbon solvent from the emulsion. The extracting solvent is used in place of the sweep gas or partial vacuum of the processes described in preceding paragraphs. Perstraction offers an advantage in energy efficiency, since it does not require volatilization of the permeated species to remove it from the permeate side of the membrane. Perstraction is also particularly useful for hydrocarbon solvents that are non-volatile or of low volatility. Examples of perstraction systems are disclosed by Hiroshi, U.S. Pat. No. 5,639,375 (Jun. 17, 1997), and Semmens, U.S. Pat. No. 4,960,520 (Oct. 2, 1990), both of which are incorporated herein by reference.

A fifth membrane separation system is one referred to in the art as "osmotic distillation." The membrane used in this system is a microporous membrane of a material that is not wettable by the liquids used on either side of the membrane. The emulsion in liquid form is placed in contact with the feed side of the membrane, while a liquid that is miscible with the hydrocarbon solvent is placed in contact with the permeate side of the membrane. The hydrocarbon solvent vaporizes from the emulsion, passes as a vapor through the membrane, and dissolves in the liquid on the permeate side which is then separated and replaced.

A sixth membrane separation system is one referred to by those skilled in the art as a "supported liquid membrane." The membrane in a supported liquid membrane system is a microporous membrane whose pores are occupied by a liquid oligomer or polymer that is amphiphilic, i.e., one that contains alternating polar and hydrophobic regions. The hydrophobic regions are typically a linear or branched alkylene group, such as ethylene, propylene or butylene, while the polar regions are typically linkages such as an ether, ester, carbonyl, urethane, urea, amino, phosphine oxide, nitro, sulfoxide, and sulfone linkages. Selection of the polar moiety controls the selectivity of the oligomer or polymer for organic compounds and hence the selectivity of the permeability of the hydrocarbon solvent. The emulsion in liquid form is placed in contact with the feed side of the membrane and the permeating hydrocarbon is removed from the permeate side as either a vapor or a liquid. The primary utility of supported liquid membranes is for the removal of hydrocarbon solvents that are polar in nature, and an advantage of this system is its flexibility by selection of the amphiphilic liquid and its lack of a need to pass the solvent through a dense (nonporous) membrane. Descriptions and examples of supported liquid membrane systems are found in Ho, U.S. Pat. Nos. 5,507,949 (Apr. 16, 1996) and 5,212, 180 (Apr. 30, 1996), and Ho et al., U.S. Pat. No. 5,552,053 (Sep. 3, 1996), each of which is incorporated herein by reference.

Membrane separation processes using dense (nonporous) membranes are preferred in most applications of this invention, with particular preference for pervaporation and membrane vapor permeation. As indicated in the discussion above, the chemical composition of the membrane can vary considerably, depending on the separation mechanism. Membranes of particular interest are silicone membranes such as polydimethyl siloxane (PDMS) and polyoctylmethyl siloxane (POMS) as well as composite membranes consisting of layers of PDMS and POMS. Other membranes of interest are membranes filled with zeolite or other adsorbents. In many applications, it will be beneficial to support the separatory membrane with a support membrane in composite or layered configuration, the separatory membrane often forming a thin dense film over the porous or microporous support membrane. Support membranes can enhance the selectivity of the separatory membrane, and can also increase the vapor or liquid permeation rate toward the separatory membrane. Examples of materials useful for support membranes are polyetherimide and the fluoropolymers polytetrafluoroethylene (PTFE) and polyvinylidene fluoride (PVDF). Examples of composite membranes are disclosed by Blume et al., U.S. Pat. No. 4,931,181 (Jun. 5, 1990), incorporated herein by reference.

The membrane or composite membrane can vary widely in physical form, ranging from flat sheets to hollow tubes and hollow fibers. The thickness of the membrane will vary depending on the separation mechanism, the chemistry of the membrane and the nature and composition of the emulsion and the hydrocarbon solvent. For separation processes involving dense (nonporous) membranes, the thickness of the dense portion of the membrane will typically range from about one micron to about 25 microns. In the case of PDMS, a thickness of about 3 to 5 microns is the most preferred, for a good compromise between selectivity and solvent flux.

Membranes for use in any of the above-described processes are typically assembled into modules or cartridges, examples of which are disclosed in the referenced patents. The modules or cartridges serve to promote the flow of liquid, vapor, or liquid-vapor combinations past the feed sides of the membranes, while promoting the flow of a sweep gas or extraction liquid or the maintenance of a low pressure on the permeate side. Examples of modules are hollow fiber modules, hollow tube modules, spiral-wound modules, and plate-and-frame modules. The choice of module is not critical to the invention, although certain types of modules are preferred over others. Hollow fiber modules, for example, offer the advantage of exposing a very large membrane surface area in a small volume; plate-and-frame modules permit the use of sheet membranes and are easy to disassemble and clean; and spiral-wound modules permit the use of sheet membranes and yet have a high surface-area-to-volume ratio.

Procedures for the use of the various membrane systems described above will be readily apparent to those familiar with these systems in their prior applications. In the case of pervaporation, for example, the emulsion is placed in a heated pressure vessel and pumped through a pervaporation module that contains a suitable membrane. The hydrocarbon solvent(s) and any residual monomers that are dissolved in the aqueous phase of the emulsion permeate through the membrane, and are continuously replaced by solvent and monomer that diffuse across the interface from the organic phase, including solvent that is originally held by and then released from the emulsified rubber particles. The permeated solvent is removed at the permeate side by a sweep gas or a partial vacuum, and may be condensed for reuse or adsorbed onto an adsorbent medium for recovery or disposal. Frequently, a single pass through the module does not remove all solvent from the emulsion, and the emulsion residue is recirculated. As solvent is removed from the emulsion, elevated temperatures are needed to induce solvent to dissolve in the aqueous phase. Accordingly, a continuing increase in temperature may be necessary as the permeation proceeds.

The most efficient pervaporation processes have little or no head space where vapor can accumulate and foam can form. Hollow fiber modules are specially designed to minimize or eliminate head space. A preferred pervaporation module is one that contains a nonporous POMS layer approximately one micron in thickness on a porous polyetherimide substrate, the layered substrate being in the form of a hollow fiber and the module containing a multitude of such fibers. The fiber length is approximately 30 cm, and the internal fiber diameter is approximately 300 microns. The POMS portion of the membrane is highly selective for hydrocarbon solvents relative to water, with a high permeation rate, even at elevated temperatures. This type of module is commercially available from GKSS Forschungszenturm, Geesthacht, Germany.

When selecting a separatory membrane composition for pervaporation, best results (i.e., the highest flux) will be achieved when the solubility parameter of the membrane is closest in value to the solubility parameter of the solvent. Flux will also be greater as the solubility of the solvent in water decreases relative to the solubility of the solvent in the membrane. Additionally, the higher the vapor pressure of the solvent at a given temperature, the higher the solvent flux; the flux can also be increased by raising the temperature. When elevated temperatures are used, they will typically range from about 30° C. to about 90° C., and preferably from about 45° C. to about 75° C. Particularly preferred solvents are therefore those that have a limited solubility in water, reasonably high vapor pressures, and solubility parameters close to that of the separatory (dense) membrane. For these reasons, solvents such as butane, pentane, pentene, hexane and cyclopentane are preferred with PDMS membranes. Toluene is also of interest in certain systems, as are mixtures of solvents or the inclusion of co-solvents. For polyisoprene, for example, acetone and ethyl alcohol are useful cosolvents to completely dissolve the polymer.

Preferred operating conditions are those that do not promote coagulation of the rubbery polymer from the emulsion, and particularly those that suppress coagulation and thereby stabilize the emulsion, since coagulation interferes with the flow of the emulsion and with the passage of liquid and gas through the membranes. At temperatures above about 70° C., it is often beneficial to add a high-temperature stabilizing agent. Temperature-stable surfactants such as potassium polyisobutenyl succinate and potassium polyisobutenyl acrylate are useful in this regard. Other stabilizers of similar structure are disclosed in Beerbower et al., U.S. Pat. No. 3,998,772 (Dec. 21, 1976), incorporated herein by reference.

The solvent flux is generally highest at the start of a pervaporation procedure due to the more rapid transport of solvent out of the organic phase into the aqueous phase. As separation proceeds, the flux tends to drop. When the residual amount of solvent is low enough that excessive foaming is no longer a risk, it is often desirable to complete the solvent removal by a traditional solvent stripping technique such as distillation or air stripping.

In many applications within the scope of this invention, pervaporation can be combined with membrane vapor permeation to remove the solvent from the emulsion. The membrane vapor permeation can be performed simultaneously with or after a pervaporation stage to increase the chemical driving force and hence the solvent flux. A still greater solvent flux in the membrane vapor permeation stage can be achieved in some cases by elevating the pressure on the feed side of the membrane, since the driving force is directly related to the partial pressure differential of the solvent across the membrane.

An example of a module for combined pervaporation and membrane vapor permeation is a plate-and-frame module employing flat composite membranes each containing a dense layer of PDMS supported on a solvent-resistant porous substrate of PVDF, PTFE, or other similar material. The emulsion is heated under pressure until the solvent begins to boil out, which creates foam and froth in the emulsion. The vapor phase has a high concentration of the solvent vapor combined with air. The combination of vapor, foam, froth, and liquid are pumped to the module. Solvent enters the membrane from both the vapor phase and the liquid phase, and thus both pervaporation and membrane vapor permeation occur simultaneously. A sweep gas or partial vacuum is applied to the permeate side of the composite membrane to remove the permeated solvent. Non-permeated gas and residual liquid are pumped back to the heated emulsion vessel for reheating and recirculation. Typical solvent fluxes in this combined operation are between 0.5 and 3.0 kg/h/m$^2$ of membrane.

Combined pervaporation and membrane vapor permeation can be performed in other types of membrane modules such as hollow fiber modules and spiral-wound modules. In each case, it is important to control the process so that the foam does not dry out since this can create undesirable coagulation of the rubbery polymer. Modules of any of these types can be cleaned by passing solvent through the liquid flow path(s) to dissolve and flush any coagulated rubbery polymer.

To use membrane distillation methods in place of pervaporation or the combination of pervaporation and membrane vapor permeation, a typical module is one containing microporous hollow polypropylene fibers. The heated emulsion is typically pumped in liquid form into the fiber lumens while a sweep gas or partial vacuum is applied to the shell (permeate) side. Air or any inert gas such as nitrogen can be used as the sweep gas, although water vapor or steam at reduced pressure are also acceptable. When a partial vacuum is used, the pressure should be maintained above the bubble point pressure of the microporous fibers. The use of a sweep gas is preferred, and solvent fluxes in the range of 0.2 to 5.0 kg/h/m$^2$ can be obtained. Membrane distillation works best with hydrocarbon solvents of low boiling point such as pentane. If an undesirable amount of water passes through the membrane, however, the water thus lost can be replaced with fresh water. As in pervaporation systems, it is often necessary to increase the temperature of the system as the separation proceeds, to help remove the last amounts of solvent from the emulsion. Higher temperatures may also increase the permeation rate of water, which lowers the selectivity of the process as it continues.

To use perstraction as the separation process, a system identical to those described above can be used, except that an extraction liquid is used in place of a sweep gas or a partial vacuum. The choice of extraction liquid may vary with the solvent to be extracted, but will be readily apparent to those skilled in liquid-liquid extraction. With hexane or pentane as the solvent, for example, vegetable oil or dodecanol will serve effectively as the extraction liquid. Perstraction will work best when the pores of the membrane are not wetted with either the extraction liquid or the hydrocarbon solvent.

When separation is achieved by a supported liquid membrane system, the pores of the membrane can be wetted with either the extraction liquid or the amphiphilic liquid with no detriment to the separation efficiency. In either case, the solvent passes through the wetted pores into the extraction fluid. Best results are obtained when the pressures on both sides of the membrane are equal.

Other membrane processes of use in this invention are vacuum-assisted reverse osmosis and thick-film equilibrium separation processes. Still other processes and combinations of processes will be apparent to those of skill in membrane technology.

This invention is applicable to rubbery polymer latices in general, including the wide variety of synthetic rubbery polymers known in the art that can be prepared by solution polymerization as well as other processes including gas-phase polymerization. The gas-phase polymerization process is known in the art, and while it avoids the use of solvents entirely, the resulting polymer can then be dissolved in a hydrocarbon solvent which is then used in the preparation of the emulsion. Rubbery polymers that can be produced by either method include homopolymers as well as copolymers, block copolymers and graft copolymers. Illustrative types of polymers are stereospecific polymers of conjugated dienes such as isoprene and butadiene, and copolymers of these conjugated dienes with monovinyl aromatic compounds such as styrene, copolymers of conjugated dienes with acrylonitrile, and copolymers of ethylene with other α-alkenes or with one or more polyenes, such as ethylene/propylene copolymers and terpolymers, halogen-containing derivatives such as chloroprene, epichlorohydrin, and various fluoroelastomers, sulfonated derivatives such as chlorosulfonated polyethylene, silicones, urethanes, and acrylic elastomers. Examples of polyenes that can be incorporated into the polymeric structure are hexadiene-1,4-dicyclopentadiene, 5-ethylidene-norbornene-2, 5-propylidene-norbornene-2, and cyclooctadiene. Preferred polymers are cis-1,4-polyisoprene, butyl rubber, chlorosulfonated polyethylene, synthetic block copolymers, and synthetic multi-block-copolymers. Polymers of particular interest are cis-1,4-polyisoprene, butyl rubber, chlorosulfonated polyethylene, styrene-ethylene/butylene-styrene tri-block copolymer, styrene-isoprene-styrene copolymer, and styrene-butadiene-styrene copolymer. Among these, cis-1,4-polyisoprene is a prominent example.

The polymers are formed by conventional polymerization processes well known among those skilled in synthetic rubber technology, using conventional solvents, together with catalysts, accelerators, and other additives as desired or necessary for achieving latices and final products of specified physical and chemical characteristics for particular uses. The solvent is typically an aliphatic hydrocarbon, saturated or unsaturated, and linear, branched, or cyclic. The volatility of the solvent may vary, and will affect the choice of membrane separation system used in the subsequent stages of the process when the solution is emulsified and the solvent is sought to be removed from the emulsion. Preferred solvents are aliphatic hydrocarbons containing 5 to 8 carbon atoms. Examples of such solvents are pentane, pentene, hexane, heptane, cyclohexane and cyclopentane.

Additives that are desirable for certain latices include crosslinking agents, sulfur vulcanization agents, or both. Examples of crosslinking agents are peroxides such as dicumyl peroxide and benzoyl peroxide; and multifunctional hydroxy, mercapto and amino compounds such as quinone dioximes, alkylphenol disulfides, phenol-formaldehyde reaction products, bisphenols, 2,5-dimercapto-1,3,4-thiadiazole derivatives, trithiocyanuric acid, methylene dianiline, and triethylene tetramine. Examples of sulfur vulcanization agents are 4-morpholino-2-benzothiazole disulfide, dipentamethylenethiuram hexasulfide, tetrabenzylthiuram disulfide, tetraethylthiuram disulfide, and tetrabutylthiuram disulfide. Some of these agents are best added to the hydrocarbon solution of the polymer before the solution is formed into an emulsion. In particular, agents that are the least soluble are preferably added in the solution stage prior to emulsification, although many agents can successfully be added after the emulsion has been formed.

The emulsions can be stabilized by emulsifying agents selected from the wide variety known in the art. Typical emulsifying agents are potassium and sodium salts of rosin acids and higher fatty acids, examples of which are potassium and sodium salts of oleic acid, palmitic acid, stearic acid, lauric acid, myristic acid, arachidic acid, and ricinic acid, as well as sulfates and sulfonates of these acids, such as sodium lauryl sulfate and sodium lauryl sulfonate. Other typical emulsifying agents are amine salts of hydroxylamines of long-chain fatty acid esters, quaternary ammonium salts such as stearyl-dimethylbenzylammonium chloride and tridecylbenzenehydroxyethylimidazole chloride, phosphoric esters of higher alcohols such as capryl and octyl alcohol, and monoesters of oleic acid and pentaerythritol such as sorbitan monooleates.

The amount of emulsifier is not critical and will be dictated by the other components of the emulsion and their amounts as they determine what is needed to stabilize the emulsion. In general, the emulsifying agent will constitute from about 0.03% to about 5.0% of the aqueous phase by weight, preferably from about 0.1% to about 3.0% by weight. The relative amounts of aqueous and organic phases (in the emulsion, prior to extraction of the solvent) will also vary and are not critical to the invention. In most cases, a volume ratio (organic:aqueous) of from about 0.5:1 to about 2.0:1 will suffice, although ratios closer to 1:1, such as a range of from about 0.75:1 to about 1.25:1, are preferred.

Once the hydrocarbon solvent has been removed, the residual material on the feed side of the membrane is a latex (i.e., a suspension of rubbery polymer particles in water) suitable for processing into synthetic rubber and the various articles that can be made of synthetic rubber. In certain systems, it will be desirable to reduce the amount of water in the latex, i.e., concentrate the latex, prior to further processing. This can be done by any conventional method for evaporating water from an aqueous solution or suspension. A preferred method for purposes of the present invention is ultrafiltration, using an ultrafiltration membrane. Examples of such membranes and their use in concentrating latices are disclosed by DelPico, U.S. Pat. No. 4,160,726 (Jul. 10, 1979) and Tanaka et al., U.S. Pat. No. 5,569,740. The disclosures of both of these patents are incorporated herein by reference.

The following examples are offered for purposes of illustration and are not intended to limit the scope of the invention.

EXAMPLE 1

Preparation of Synthetic Polyisoprene Solution in Hexane

This example illustrates the preparation of a solution of synthetic polyisoprene in n-hexane for use in the preparation of a synthetic polyisoprene emulsion, and ultimately a synthetic polyisoprene latex. The polyisoprene used was NATSYN 2200 cis-1,4-polyisoprene, a product of The Goodyear Tire & Rubber Company, Chemical Division, Akron, Ohio, USA. A 35-L stainless steel mixing vessel was fitted with a laboratory mixer with stainless steel shaft and disintegrator mixing head. n-Hexane (20 L) was added to the vessel and the mixer was run at 1700 rpm. The polyisoprene (1983 g) was cut into small pieces of about 10 g each and added slowly to the mixing vessel. Mixing continued for four hours, during which time most of the polyisoprene dissolved. A further 5 L of n-hexane were then added to lower the viscosity of the solution and mixing was continued for an additional four hours which resulted in the polyisoprene becoming fully dissolved.

EXAMPLE 2

Preparation of Polyisoprene Emulsion

A high-shear rotor/stator mixer/emulsifier (Model 100LC, Charles Ross & Son Company, Hauppage, N.Y., USA) was charged with purified water (600 g) and DRESINATE 214 anionic surfactant (7 g, a potassium salt of a modified rosin, obtained from Hercules Inc., Wilmington, Del., USA). The contents of the vessel were mixed until all the surfactant had dissolved. The polyisoprene-n-hexane solution prepared in Example 1 (600 g) was then added to the vessel, and mixing was continued at 10,000 rpm for five minutes. The resulting emulsion was left to stand for approximately one hour, after which time a small amount of non-emulsified material was removed.

EXAMPLE 3

Removal of Solvent from Emulsion by Pervaporation in a Spiral-Wound Module

The emulsion prepared in Example 2 was separated in a spiral-wound pervaporation membrane module supplied by Osmonics Desal, Escondido, Calif., USA. The module contained a polydimethylsilicone (PDMS) membrane approximately 50 microns think, with a surface area of approximately 0.25 m$^2$. The emulsion was heated to 55° C. and circulated through the module while a partial vacuum was applied to the permeate side of the module, with a liquid nitrogen condenser fitted between the permeate side of the module and the vacuum pump. The flow rate of emulsion through the module was approximately 2 liters per minute.

The solvent flux at the start of the experiment was calculated to be approximately 0.3 kg/h/m$^2$ of membrane, based on the condensed hexane, although the actual solvent flux was higher due to hexane that passed through the condenser and was included in the exhaust of the vacuum pump.

In the first hour, the volume of the emulsion decreased from about 2000 mL to 1825 mL; in the second hour, the volume decreased to 1700 mL. The decrease confirmed that liquid had been passed from the emulsion through the membrane. Further confirmation was obtained from the observation of solidified hexane precipitating inside the liquid nitrogen condenser. In the meantime, the emulsion remained uniform in appearance, attaining a bright white color at the end of the test, indicating that the rubbery particles were still suspended.

EXAMPLE 4

Removal of Pentane Solvent from Polyisoprene Emulsion by Pervaporation in a Spiral-Wound Module An emulsion was prepared in accordance with the procedures of Examples 1 and 2, using n-pentane in place of n-hexane and potassium oleate in place of DRESINATE 214. The emulsion was heated to 60° C., and 96 mL of pentane was recovered in the condenser in twenty minutes. This is equivalent to a pentane solvent flux of approximately 0.7 kg/h/m$^2$ of membrane. The actual flux was higher due to pentane that passed through the condenser and was included in the exhaust of the vacuum pump.

By visual observation, the emulsion remained uniform in appearance, attaining a bright white color at the end of the test, indicating that the rubbery particles were still suspended.

EXAMPLE 5

Removal of Pentane Solvent from Polyisoprene Emulsion by Membrane Distillation

An emulsion was prepared in accordance with the procedures of Examples 1 and 2, using n-pentane in place of n-hexane and potassium oleate in place of DRESINATE 214. Separation of the n-hexane from the emulsion was then performed on a LIQUI-CEL Extra-Flow membrane contactor (Model 5PCG-259, Hoechst Celanese, Charlotte, N.C., USA), which includes a hot water bath, a container to hold the emulsion, a double diaphragm liquid pump, a condenser, and a vacuum pump. The membrane was in the form of a fiber bundle of microporous hollow polypropylene fibers, each fiber having an outside diameter of 300 microns and a lumen diameter of 240 microns, the bundle being 2.5 inches (6.35 cm) in diameter and containing about 7,400 fibers, and the fiber cartridge 8 inches (20.3 cm) in length. The effective surface area of the fibers was 1.4 m$^2$, based on the outside diameter of the fibers. The emulsion was heated to 55–60° C. and was pumped at this temperature through the lumens of the fibers in a continuous recirculating manner, while the shell side of the contactor (the side in communication with the exterior walls of the fibers) was swept with ambient air, the emulsion flow and the air flow being countercurrent. The flows were continued for twenty minutes, over which time 120 mL of n-pentane was condensed, equivalent to a flux of 186 g/h/m$^2$. No breakthrough of fluid through the membrane pores was noted.

EXAMPLE 6

Removal of Pentane Solvent from Polyisoprene Emulsion by Supported Liquid Membrane An emulsion was prepared in accordance with the procedures of Examples 1 and 2, using n-pentane as the solvent and potassium oleate as the emulsifying agent. The LIQUI-CEL Extra-Flow membrane contactor and microporous polypropylene fibers of Example 5 were used.

The procedure was similar to that of Example 5 except that mixed vegetable oil was circulated through the shell side of the contactor as an extraction fluid rather than air. On the lumen side, the emulsion was circulated through the lumens while being slowly heated to 70° C., the two flows being countercurrent at flow rates that resulted in a pressure gradient decreasing from the lumen side to the shell side. The circulations were continued for thirty minutes; the specific gravity of the oil was measured at the start of the experiment and again at the end, and the results were used to determine the approximate amount of pentane extracted by the oil. Based on these measurements, the pentane flux was estimated to be approximately 0.5 kg/h/m$^2$ of membrane. A small amount of emulsion was observed to have passed through the pores of the membrane.

EXAMPLE 7

Removal of Pentane Solvent from Polyisoprene Emulsion Using a Combination of Pervaporation and Membrane Vapor Permeation To prepare a 10% solids solution of synthetic polyisoprene in n-pentane, strips of NATSYN 2200 synthetic polyisoprene, each approximately ½-inch wide, were cut from a standard 75-lb commercial bale of the material using a hacksaw. The strips were then cut into 1-inch to 2-inch lengths using hand shears. The resulting strips (1.8 kg), together with 16.2 kg of n-pentane, were placed in a 30-quart stainless steel mixing vessel fitted with a medium shear mixer with a sawtooth-type disintegrator mixing blade, and the vessel contents were stored for 24 hours at room temperature to allow for softening and swelling of the rubber pieces. The vessel contents were, then mixed at a mixer speed of 1700 rpm while evaporation of n-pentane was minimized by covering the vessel with a drum cover with a center hole for the mixer shaft. Mixing was continued until the polyisoprene had completely dissolved.

Several small batches of emulsion, each containing 2 L of polyisoprene-pentane solution and 1 L of deionized water, were prepared by first placing the water in a 4-L mixer/ emulsifier vessel, then adding 11 g of potassium oleate paste and mixing until the paste was fully dissolved. Mixing was then continued as 2 L of the polyisoprene-pentane solution were slowly added over approximately 30 minutes. After an additional five minutes of mixing, the emulsion was poured into a 15-L stainless steel storage tank. After 12 L of emulsion had been added, the tank was placed under the mixing head of the mixer-emulsifier and a further 6.25 g of potassium oleate paste were mixed in. Polyisobutenyl succinate, potassium salt (5.0 g), was then added and thoroughly mixed in the emulsion.

Removal of the pentane from the emulsion was then accomplished using a composite membrane made of a polydimethylsilicone (PDMS) membrane approximately 3–4 microns in thickness on a porous polyvinylidene fluoride (PVDF) support. Sheets of the composite membrane measuring 35 inches×10.5 inches were sealed into individual acrylic plates and frames, with the permeate (PVDF) side of each membrane supported against the plate with finely woven nylon mesh to allow for improved flow of vapor under the influence of a partial vacuum. The PDMS sides of the membranes in each frame faced each other to create a flow-through channel for the emulsion and any foam that developed. Several such frames were arranged in layers.

Emulsions were fed to the feed side of the composite membrane frames, while the pressure on the permeate sides of the membranes was maintained at approximately 5 inches Hg absolute. The emulsion feed was slowly heated during the permeation, reaching a maximum temperature of approximately 85° C. n-Pentane permeating through the membranes was condensed at 60–80° F. (15–27° C.), and the n-pentane flux was measured at 0.75–1.5 kg/h/m². Permeating water was also collected at a flux of approximately 38–75 g/h/m². The separation process was continued until the temperature in the reaction vessel stabilized at 85° C. and the pentane flux slowed to a rate of less than 20 g/h/m².

The essentially pentane-free latex at this point had a solids content of approximately 12 weight percent. To raise the solids content, the latex was pumped in a recirculating manner through an ultrafiltration system (Model UFP-500-E5A Ultrafiltration Module, obtained from A/G Technology Corporation, Needham, Mass., USA) at approximately 12 L/min with a feed side inlet pressure of 30 psig and a permeate pressure of 10 psig less than the average of the inlet and outlet feed-side pressures. This produced a permeate rate of approximately 8 L/h. The ultrafiltration removed both water and part of the emulsifying agent from the latex. The permeate solution was clear, indicating that essentially no solid latex particles had passed through the ultrafiltration membrane. Once 11 L of ultrafiltrate had been removed, more deionized water (16 L) was added to the feed side of the module and ultrafiltration was continued until the latex was concentrated to a solids content of approximately 40 weight percent.

The foregoing is offered primarily for purposes of illustration. It will be readily apparent to those skilled in the art that the component shapes and dimensions, materials, operating conditions, procedural steps and other parameters of the inventions described herein may be further modified or substituted in various ways without departing from the spirit and scope of the invention.

What is claimed is:

1. In a process for the preparation of a rubbery polymer latex from a solution of a rubbery polymer in a hydrocarbon solvent by emulsifing said solution in an aqueous liquid to create an oil-in-water emulsion and removing hydrocarbon solvent from said emulsion to form a latex, the improvement comprising removing said hydrocarbon solvent by partitioning said emulsion through a membrane having a feed side and a permeate side, said membrane preferentially passing said hydrocarbon solvent relative to water and to said rubbery polymer, leaving a rubbery polymer latex on said feed side of said membrane.

2. The process of claim 1 in which said rubbery polymer is a member selected from the group consisting of cis-1,4-polyisoprene, butyl rubber, chlorosulfonated polyethylene, synthetic block copolymers, and synthetic multi-block-copolymers.

3. The process of claim 1 in which said rubbery polymer is a member selected from the group consisting of cis-1,4-polyisoprene, butyl rubber, chlorosulfonated polyethylene, styrene-ethylene/butylene-styrene tri-block copolymer, styrene-isoprene-styrene copolymer, and styrene-butadiene-styrene copolymer.

4. The process of claim 1 in which said rubbery polymer is synthetic cis-1,4-polyisoprene.

5. The process of claim 1 in which said hydrocarbon solvent is an aliphatic hydrocarbon containing 5 to 8 carbon atoms.

6. The process of claim 1 in which said hydrocarbon solvent is a member selected from the group consisting of pentane, pentene, hexane, heptane, cyclohexane and cyclopentane.

7. The process of claim 1 in which said partitioning comprises a member selected from the group consisting of:

(a) pervaporation, defined as contacting said emulsion in liquid form with a nonporous membrane that preferentially passes said hydrocarbon solvent from said emulsion as a permeating vapor;

(b) membrane vapor permeation, defined as contacting said emulsion with a nonporous membrane that preferentially passes said hydrocarbon solvent from said emulsion as a permeating vapor, said partitioning further comprising vaporizing said hydrocarbon solvent in said emulsion prior to passing said hydrocarbon solvent through said membrane;

(c) membrane distillation, defined as contacting said emulsion with a microporous membrane under conditions that prevent wetting pores of said membrane with liquids from said emulsion, and yet that maintain a partial pressure gradient of said hydrocarbon solvent vapor across said membrane sufficient to effect preferential permeation of said membrane by said hydrocarbon solvent vapor;

(d) perstraction, defined as contacting said emulsion in liquid form with said membrane while contacting said permeate side of said membrane with an extracting solvent that preferentially dissolves said hydrocarbon solvent;

(e) osmotic distillation, defined as contacting said emulsion in liquid form with a microporous, non-liquid-wettable membrane while contacting said permeate side of said membrane with a liquid miscible with said hydrocarbon solvent; and (f) partitioning through a supported liquid membrane, defined as a microporous membrane whose pores are impregnated with a liquid species selected from the group consisting of oligomers and polymers having alternating polar and hydrophobic regions, said liquid species selected to effect preferential permeation of said hydrocarbon solvent.

8. The process of claim 7 in which said partitioning comprises pervaporation.

9. The process of claim 7 in which said partitioning comprises membrane vapor permeation.

10. The process of claim 7 in which said partitioning comprises membrane distillation.

11. The process of claim 7 in which said partitioning comprises perstraction.

12. The process of claim 7 in which said partitioning is performed through a supported liquid membrane.

13. The process of claim 7 in which said partitioning comprises a combination of two or more processes selected from the group consisting of pervaporation, membrane vapor permeation, membrane distillation, perstraction, osmotic distillation, and the use of a supported liquid membrane.

14. The process of claim 7 in which said partitioning comprises a member selected from the group consisting of pervaporation and membrane vapor permeation, and said membrane is a composite membrane comprising a nonporous membrane supported by a porous support membrane.

15. The process of claim 14 in which said nonporous membrane is a member selected from the group consisting of polydimethylsiloxane and polyoctylmethylsiloxane, and said porous support membrane is a member selected from the group consisting of polyetherimide, polytetrafluoroethylene and polyvinylidene fluoride.

16. The process of claim 14 further comprising heating said emulsion to a temperature of from about 30° C. to about 90° C. while partitioning said emulsion through said membrane.

17. The process of claim 14 further comprising heating said emulsion to a temperature of from about 45° C. to about 75° C. and wherein further still a high temperature stabilizing agent is added to said emulsion prior to partitioning said emulsion through said membrane.

18. The process of claim 14 further comprising heating said emulsion to a temperature of from about 45° C. to about 75° C. and wherein further still a member selected from the group consisting of potassium polyisobutenyl succinate and potassium polyisobutenyl acrylate is added to said emulsion prior to partitioning said emulsion through said membrane.

\* \* \* \* \*